May 8, 1956 W. W. SEWELL ET AL 2,744,642
CRATE LOADING MECHANISM
Filed Sept. 18, 1952 3 Sheets-Sheet 1
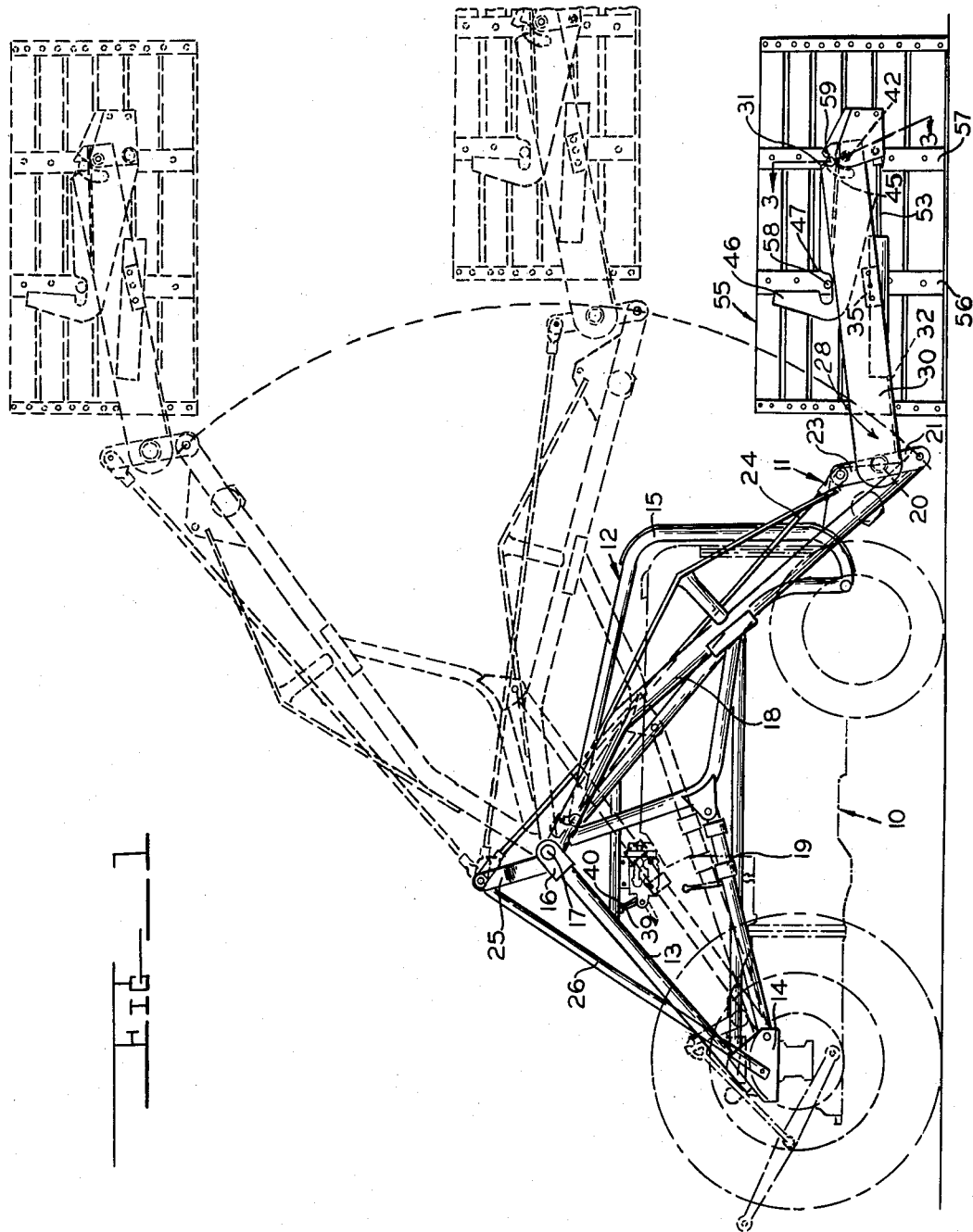
INVENTORS
WALTER W. SEWELL
& RAYMOND W. WILSON
BY
AND
ATTORNEYS

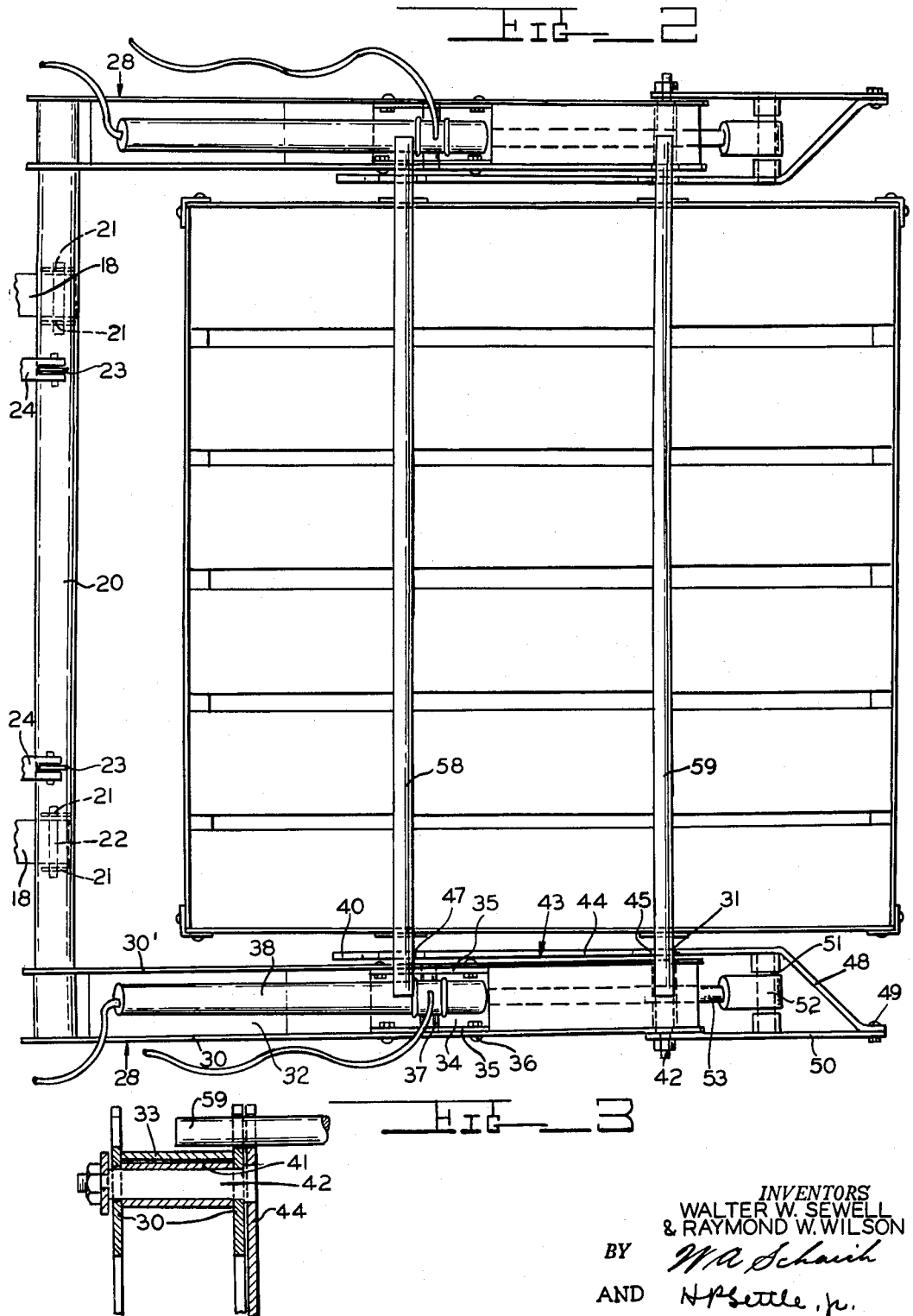

May 8, 1956  W. W. SEWELL ET AL  2,744,642
CRATE LOADING MECHANISM
Filed Sept. 18, 1952  3 Sheets-Sheet 3
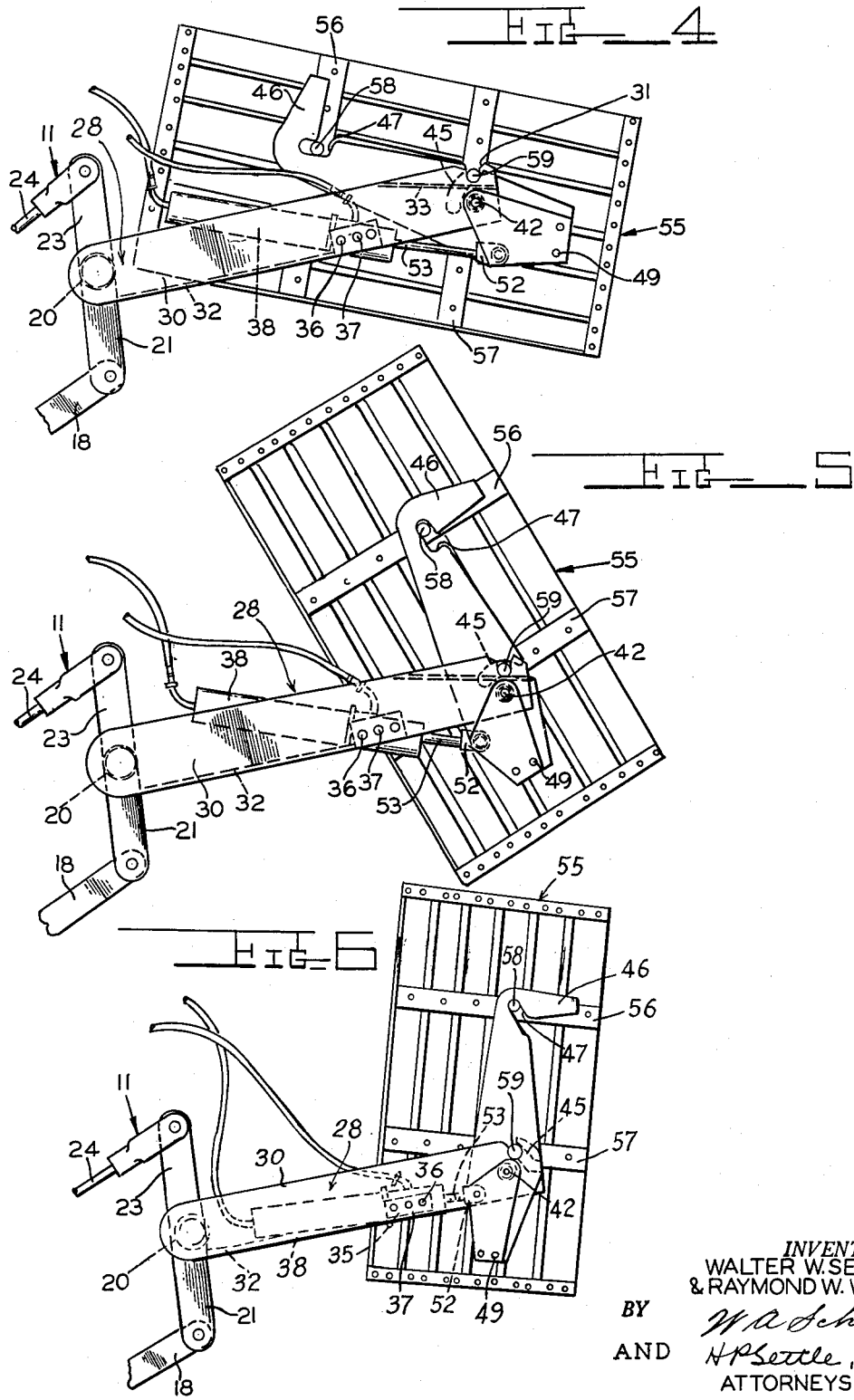
INVENTORS
WALTER W. SEWELL
& RAYMOND W. WILSON
BY
AND
ATTORNEYS United States Patent Office 2,744,642
Patented May 8, 1956

2,744,642
CRATE LOADING MECHANISM

Walter W. Sewell and Raymond W. Wilson, Ferndale, Mich., assignors, by mesne assignments, to Ford Motor Company, Dearborn, Mich., a corporation of Delaware Application September 18, 1952, Serial No. 310,228

6 Claims. (Cl. 214—313)

The present invention relates to a material handling apparatus for a tractor and more particularly to an apparatus for elevating and dumping particulated material.

The material handling apparatus of the present invention is particularly adapted to the loading and/or dumping of flowable or particulated materials, such as citrus fruits or the like contained within open topped receptacles or crates. The apparatus preferably takes the form of an attachment for a standard tractor-mounted loader having lifting booms extending forwardly of the tractor and having forward free ends movable in an arcuate vertical path. By the use of the attachment of the present invention, the receptacles or containers within which the material is confined may be elevated and/or lowered in such manner that the receptacle is not tilted during vertical movement, but rather remains substantially parallel to the ground. The receptacle may be tilted for dumping about a transverse axis at any point during its vertical travel, the receptacle being dumped from and returned to its horizontal position under complete power control.

Generally, the attachment comprises a pair of forwardly extending main support or lift arms and a relatively movable dumping arm pivotally attached to each support arm, the arms being adapted to project along either lateral extremity of the receptacle to engage longitudinally spaced, laterally projecting trunnions carried by the receptacle. Remote controlled power means are provided for actuating the pivot or dumping arms for relative movement, so that the trunnions engaged by the dumping arms are moved in an arcuate path about the trunnions carried by the support arms to at least partially invert the receptacle under control of the power means. Preferably, the connections of both the lift arms and the dumping arms to the receptacle is accomplished by the insertion of the receptacle trunnions into corresponding open-topped slots formed in the arms, and relative movement of the arms upon dumping takes place about a pivot center remote from the axis of dumping movement of the receptacle, so that the trunnions are locked within the arm slots to prevent undesired vertical or lateral shifting of the receptacle during dumping.

It is, therefore, an important object of the present invention to provide an improved material handling apparatus for vertically moving and dumping a receptacle.

Another important object is the provision of a material handling apparatus whereby a receptacle may be elevated to a selected position at which the receptacle is parallel to the ground and at which the receptacle may be dumped under power control.

It is a further important object to provide a crate handling apparatus including relatively movable lifting and dumping arms engageable with spaced projections on a receptacle and concurrently movable to elevate the receptacle and relatively movable to dump the same.

Yet another object is the provision of a receptacle handling device for attachment to a loader boom, the device being effective to elevate the receptacle to an elevated position at which the receptacle remains substantially parallel to its lowered position, and slot and pin means for accommodating release of the receptacle in its elevated position or, if desired, for the dumping of the receptacle.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a material handling apparatus of the present invention mounted upon a prime mover and illustrating a material receptacle in a plurality of elevated positions;

Figure 2 is an enlarged fragmentary plan view of the apparatus of Figure 1 particularly illustrating a receptacle and the elevating and dumping means therefor;

Figure 3 is a greatly enlarged sectional view taken along the plane 3—3 of Figure 1;

Figure 4 is an enlarged elevational view illustrating an adjusted position of the device assumed during the dumping cycle;

Figure 5 is a view similar to Figure 4 showing a second adjusted position of the device during the dumping cycle; and Figure 6 is a view similar to Figures 4 and 5, illustrating the relative positions of the receptacle and the dumping means at the termination of the dumping cycle.

As shown on the drawings:

As shown on the drawing in Figure 1, reference numeral 10 refers generally to a tractor 10 or similar prime mover upon which is disposed a material handling apparatus of the present invention indicated generally by reference numeral 11.

More particularly, the device 11 includes a fixed frame 12 mounted upon the tractor 10 and including a pair of laterally spaced upwardly and forwardly inclined posts 13 secured at their lower rear ends to rear axle brackets 14 fixed to the tractor. The fixed frame also includes a forwardly extending bumper structure 15 secured to the tractor front axle mounting (not shown) and cooperating with the posts 13 to distribute the weight of the device 11 and its load upon the tractor front and rear axles. It will be appreciated that a pair of posts 13 are provided to extend longitudinally along each side of the prime mover 10. The posts 13 each terminate at the upper forward end thereof in a clevis 16 mounting a lateral pivot pin 17. The pivot pins 17 carry forwardly extending laterally spaced loader booms 18 projecting forwardly beyond the bumper structure. An actuating hydraulic cylinder 19 is connected between each boom 18 and the associated bracket 14, so that, upon actuation of the cylinders 19, the booms 18 are raised and lowered, as best shown in Figure 1.

The free forward ends of the booms 18 are joined by a laterally extending tubular cross-shaft 20 (Figure 2) having laterally spaced pairs of depending ears 21 longitudinally aligned with the loader booms. Each pair of ears 21 carries a laterally extending pin 22 pivotally securing the terminal end of the associated boom therebetween, so that elevation and lowering of the booms causes corresponding vertical movement of the cross shaft 20. The cross-shaft 20 also carries an upstanding ear 23 spaced laterally inwardly from each pair of depending ears 21. The upstanding ears 23 are pinned or otherwise pivotally connected to a generally rearwardly extending stabilizer rod 24 extending generally parallel to the associated boom 18 for attachment to an upstanding post 25 mounted upon the transverse brace member (not shown) joining the loader posts 13. The posts 25 are each reinforced by a downwardly and rearwardly extending reinforcing rod 26 connected to the rear axle bracket 14 of the tractor 10. The purpose of the stabilizer bars 24 will be readily appreciated from an inspection of the adjusted positions of the booms 18, the cross shaft 20 and the stabilizing rods 24 in Figure 1 of the drawings. The height of each post 25 is substantially the same as the combined heights of the ears 21 and 23, and the length of the stabilizer bars is the same as the length of the booms 18, so that upon elevation of the booms the parallelism existing between the stabilizer rods 24 and the booms 18 will retain the ears 21 and 23 at a constant inclination relative to the ground for a purpose to be hereinafter more fully described.

As best illustrated in Figures 2, 4, 5, and 6, the cross shaft 20 is provided with a forwardly extending lift arm assembly indicated generally at 28. One such assembly 28 is provided at either lateral extremity of the cross shaft. More particularly, the assembly 28 includes pairs of identical laterally spaced forwardly projecting arms 30 welded or otherwise rigidly secured to the ends of the cross shaft laterally outwardly from the loader booms 18. The arms 30 are generally rectangular in configuration and are provided adjacent their outer extremities with open topped notches 31.

The laterally outer arms 30 of each pair are joined to the associated inner arms 30' along the length of the arms by a pair of laterally extending reinforcing webs 32 joining the inner portions of the arms and an upper similar web 33 closely underlying the bottom of the notch 31. The arms also carry separate trunnion plates 35 abutting the opposed inner surfaces of the arms and secured thereto by suitable means, such as bolts 36. The plates 35 each carry inwardly projecting trunnions 37 pivotally supporting a remote controlled hydraulic cylinder 38 for pivotal movement relative to the arms, as best illustrated in Figures 4–6. The cylinders are of the double-acting type and are actuated by the pressured fluid which also serves to elevate and lower the loader booms 18 as determined by the loader hydraulic control system, including individual manually manipulatable valve control arms 39 and 40 for the loader booms 18 and the remote cylinders 38, respectively.

Adjacent the forward ends of the lift arms 30 and substantially vertically aligned with the notches 31, the arms 30 are joined by generally cylindrical bushings 41 (Figure 3) through which projects a pivot pin 42 serving to pivotally dispose dumping arms 43 upon the lift arms 30 for relative movement. The dumping arms 43 include an inner plate-like member 44 having an arcuate slot 45 formed therein, the slot having a center of curvature located at the pivot pin 42 and having a radius of curvature equal to the distance of the notch 31 from the pin 42. The rear end of the plate-like member 44 is provided with an upstanding projection 46 at the bottom of which is provided a generally longitudinally extending re-entrant slot 47 for a purpose to be hereinafter more fully described.

The plate-like member 44 extends forwardly beyond the front end of the lift arms 30 and terminates in an outwardly deflected extension 48 joined, as by bolts 49, to a second plate-like member 50 extending rearwardly along the outside one of the associated plates 30 to receive the pivot bolt 42 therethrough. The pivot bolt 42 traverses the inner plate-like member 44, so that the dump arms 43 are pivotally secured to the associated lift arms 30. Forwardly of the lift arms, the plates 44 and 50 are joined by a pivot pin 51 attachable to the free end 52 of the actuating rod 53 of the remote control cylinder 38. Upon actuation of the remote cylinder 38, the dump arms are moved relative to the associated lift arm, and this movement is illustrated in Figure 4–6.

The apparatus of the present invention is particularly adapted for use with a receptacle such as that indicated by reference numeral 55 on the drawings, such receptacle constituting an open topped generally rectangular box or crate having side and end walls and a closed bottom. The sides and bottom of the receptacle are encircled by a pair of longitudinally spaced reinforcing straps 56 and 57 and the box is traversed by a pair of pivot rods 58 and 59 carried by the straps 56 and 57, respectively, and projecting laterally beyond the crate sides to define longitudinally spaced, laterally projecting trunnions. As best seen in Figure 1, the pivot rods 58 and 59 are spaced apart on either side of the crate through a longitudinal distance corresponding to the distance between the notch 31 in the associated lift arm 30 and the forward end of the slot 47 in the associated dump arm 43. Further, it will be noted that the receptacle 55 when resting in a horizontal position, as upon the ground, is positioned so that the pivot rod ends are entered within the notch 31 and the slot 47 when the arms are positioned alongside the receptacle. Upon elevation of the loader booms 18, the receptacle is elevated and the parallel linkage arrangement of the boom 18, the stabilizer bars 24, the ears 21 and 23, and the post 25 will cause the elevation of the receptacle to the elevated position illustrated in Figure 1 without tilting the box from its horizontal position. Thus, the box may be elevated for positioning upon a truck bed, upon a stack of other similar boxes, etc., without tilting the box so as to dump the material contained therein.

If it is desired to dump the contents of the receptacle while the receptacle is in any one of its vertical positions, it is only necessary to actuate the handle 40 controlling the operation of the remote control cylinders 38. Upon the intake stroke of the cylinders, the outer ends of the dump arms 43 are pulled downwardly and inwardly toward the loader booms about the pivot bolts 42 joining the lift arms and the dump arms. The various stages of movement of the receptacle during dumping are illustrated in Figures 4–6.

During the initial dumping stages, it will be seen that movement of the dumping arms about the pivot bolts 42 will cause entry of the forward box rod end 59 into the arcuate slot 45 of the dump arm and concurrent movement of the rear box rod end 58 into the re-entrant slot 47 of the dumping arm to lock the box against vertical movement relative to the lift arms. Continued forward (clockwise) movement of the dump arms under the influence of the remote cylinders will effect further relative movement of the dump arms and the rod ends, thus causing greater entry of the rod ends into the associated slots.

During dumping movement of the box, the box is pivoted about the forward pivot rod 59, while the dumping arms are moved by the cylinders about the pivot bolt 42 which is spaced from the pivot rod 59. The resulting differential movement of the box and the dumping arm causes entry of the rod 58 into the slot 47 and movement of the rod 59 into the slot 45. The weight of the box and its contents will retain the rods 59 and 58 within the notches 31 and slots 47, respectively, until such time as the same are locked therein upon dumping arm movement. Further, movement of the dumping arm about pivot bolt 42 will elevate the rear end of the box through the pivot rod 58 until such time as the box reaches the fully dumped position of Figure 6, at which terminal position the rod 58 bottoms within the slot 47 and the cylinder 38 bottoms on the reinforcing web 32. The operator by handle 40 may also control the operation of the remote control cylinder 38 so that the tilting of the receptacle is stopped before an off-center position is reached.

Return movement of the box to the horizontal position of Figure 1 may be accomplished upon outward movement of the actuating rod 53 of the cylinder 38. The emptied box may then be lowered to the ground and the lift arms and dumping arms removed therefrom by merely lowering the loader booms and without further relative movement of the lift arms and the dumping arms.

From the foregoing detailed description, it will then be appreciated that the present invention provides an improved material handling apparatus for flowable material within a receptacle, such as a box or crate. The parallel lifting feature of the present invention accommodates the elevation of the receptacle in a substantially horizontal position at all stages of elevation for stacking of the receptacles without spilling material therefrom and without the necessity of constantly manipulating the dump control cylinders. The dumping of the receptacles is carried out under complete power control at all stages of the dumping and return cycle, and the receptacle is locked against vertical or lateral displacement at all times during dumping. Dumping is accomplished through differential movement of the receptacle and the dumping arms about spaced pivot centers, so that the above mentioned locking of the box against movement is accomplished.

It will, of course, be understood that various details of construction may be varied through a wide range without departing from the principles of this invention and it is, therefore, not the purpose to limit the patent granted hereon otherwise than necessitated by the scope of the appended claims.

We claim:

1. In a material handling apparatus having a vertically swingable boom, a forwardly projecting lift arm on said boom, a material receptacle having a pair of longitudinally spaced trunnions projecting laterally therebeyond, said lift arm having an open-topped notch therein receiving the forward one of said trunnions therein when said arm is positioned alongside said receptacle, a dumping arm pivoted to said lift arm about a pivot axis spaced from said notch, said dumping arm having a slot concentric with said pivot axis and adapted to receive said forward trunnions therein, said dumping arm also having an open-topped notch receiving the rear one of said trunnions therein and a re-entrant slot aligned with and immediately adjacent to said notch, the dumping arm slots receiving said trunnions therein upon relative pivoted movement of said arms about said pivot axis, and power means for effecting relative arm movement so that said receptacle rear trunnion is elevated about said front trunnion as an axis to dump contents of said receptacle with the entry of said trunnions into said dumping arm slots preventing movement of said receptacle relative to said arms.

2. In a material handling apparatus having a vertically swingable boom, a pair of laterally spaced forwardly projecting lift arms on said boom for movement therewith, a material receptacle having a pair of longitudinally spaced trunnions projecting laterally beyond each side thereof, said lift arms each having an open-topped notch therein receiving the adjacent forward one of said trunnions therein when said arms are positioned alongside said receptacle, a dumping arm pivoted to each of said lift arms, respectively, about a pivot axis spaced from said notch, said dumping arms each having a slot concentric with said pivot axis and adapted to receive the respective forward trunnion therein, each of said dumping arms also having an open-topped notch receiving the rear one of said trunnions therein and a re-entrant slot, the dumping arm slots receiving said forward trunnions therein upon relative pivotal movement of said arms about said pivot axis, and means for effecting dumping arm movement so that said receptacle rear trunnions are elevated thereby about said front trunnions as an axis to dump the contents of said receptacle, with the entry of said trunnions, into said dumping arm slots because of the eccentricity of said front trunnions and the axis of pivoted dumping arm movement preventing movement of said receptacle relative to said arms.

3. In a receptacle dumping device, a receptacle having first and second longitudinally spaced trunnions projecting laterally beyond opposing sides thereof, laterally spaced lift arms extending alongside said opposing sides respectively of said receptacle and having notches receiving said first trunnions therein, a dumping arm secured to each of said lift arms, respectively, for relative pivotal movement about a pivot center spaced from said notches and having apertures therein receiving said second trunnions and arcuate slots aligned with said first trunnions and centered at said pivot center, and power means for effecting pivoting movement of said dumping arms relative to said lift arms to elevate said receptacle about a pivot axis defined by said first trunnions, relative pivotal movement of said arms effecting relative movement of said first trunnions and said slots to lock said first trunnions therein.

4. For use with a receptacle having longitudinally spaced, transversely extending first and second trunnions, a receptacle dumping device comprising laterally spaced lift arms extending longitudinally of said receptacle to underlie said trunnions and to engage with said first trunnions, dumping arms pivotally attached to said lift arms, respectively, for movement relative thereto about an axis spaced from the engagement of said first trunnions with said lift arms, said dumping arms having slots therein including first vertical portions receiving said second trunnions and second longitudinal portions into which said second trunnions are moved upon initial pivotal movement of said arms, and power means for effecting pivoted arm movement to elevate said receptacle upon relative arm movement about a pivot axis defined by the other of said trunnions, the relative eccentric pivotal movement of said receptacle and said dumping arms causing entry of said second trunnions into the longitudinal portions of said slots.

5. In a receptacle dumping device for use with a receptacle having longitudinally spaced, transversely extending first and second trunnions, the improvements of laterally spaced vertically movable lift arms extending longitudinally of said receptacle to underlie said first trunnions, said lift arms having open-topped notches receiving said first trunnions therein upon vertical movement of said lift arms, dumping arms underlying said second trunnions, said dumping arms being pivotally attached to said lift arms, respectively, for movement relative thereto about an axis spaced from said lift arm notches and having re-entrant slotted portions therein receiving said second trunnions upon pivoted dump arm movement to effect longitudinal movement of said receptacle relative to said dump arms, and power means for effecting pivotal relative dumping arm movement about the points of pivoted arm attachment to elevate said second trunnions in an arcuate path about a pivot axis defined by the first of said trunnions with the positioning of said second trunnions in said re-entrant portions preventing displacement of said receptacle during dumping.

6. In a material handling device, a material receptacle having a pair of longitudinally spaced trunnions projecting laterally beyond each side thereof, a vertically swingable boom, laterally spaced lift arms on said boom projecting therebeyond to extend alongside each side of said receptacle and having open-topped slots receiving one of said receptacle trunnions therein on either side of said receptacle, a dumping arm pivotally secured to each of said lift arms, respectively, in spaced relation to said notches and each having an open-topped notch for receiving the other of said trunnions on either side of said receptacle, said dumping arms having longitudinal slots communicating with said notches, and power means for effecting relative lift-arm dumping arm movement about their points of pivotal attachment to elevate the trunions received by said dumping arm notches about the trunnions received by said lift arms to at least partially invert said receptacle about said lift arm, said dumping arms and said receptacle thus being pivotal relative to said lift arms about eccentric axes, the eccentric movement of said dumping arms relative to said receptacle effecting relative longitudinal dumping arm-receptacle movement and entry of said other trunnions into said longitudinal slots.

References Cited in the file of this patent

UNITED STATES PATENTS

| | | |
|---|---|---|
| 1,753,756 | Small | Apr. 8, 1930 |
| 2,304,649 | McDaniels | Dec. 8, 1942 |
| 2,348,899 | Guidnard et al. | May 16, 1944 |
| 2,413,661 | Stokes | Dec. 31, 1946 |
| 2,447,150 | Andersen | Aug. 17, 1948 |
| 2,458,195 | Pearse | Jan. 4, 1949 |
| 2,495,143 | Simmonds | Jan. 17, 1950 |
| 2,517,582 | Lull | Aug. 8, 1950 |
| 2,522,441 | Galloway et al. | Sept. 12, 1950 |
| 2,593,796 | Riewerts | Apr. 22, 1952 |
| 2,626,070 | Ezell et al. | Jan. 20, 1953 |